United States Patent [19]
August

[11] 3,983,854
[45] Oct. 5, 1976

[54] AUXILIARY POLLUTION CONTROL DEVICE FOR SPARK-IGNITION ENGINES

[76] Inventor: Paul August, C/Capellades 1, Barcelona 6, Spain

[22] Filed: Aug. 2, 1971

[21] Appl. No.: 168,120

[30] Foreign Application Priority Data
Aug. 5, 1970 Germany............................ 2038967

[52] U.S. Cl. ........................... 123/119 A; 123/97 B
[51] Int. Cl.² ...................................... F02M 25/06
[58] Field of Search ............. 123/102, 119 A, 97 B; 60/478

[56] References Cited
UNITED STATES PATENTS

| | | | |
|---|---|---|---|
| 2,722,927 | 11/1955 | Cornelius | 123/119 A |
| 2,877,997 | 3/1959 | Kane | 123/97 B |
| 3,237,615 | 3/1966 | Daigh | 123/119 A |
| 3,294,073 | 12/1966 | Bressan | 123/119 A |
| 3,513,816 | 5/1970 | Daigh | 123/119 A |
| 3,561,409 | 2/1971 | August | 123/97 B |
| 3,564,580 | 2/1971 | Cinque | 123/119 A |
| 3,580,233 | 5/1971 | Busse | 123/119 A |
| 3,587,541 | 6/1971 | Sarto | 123/119 A |
| 3,596,644 | 8/1971 | Hutchins | 123/97 B |
| 3,643,640 | 2/1972 | Kraus | 123/119 A |
| 3,670,706 | 6/1972 | Fujisawa | 123/97 B |

*Primary Examiner*—Wendell E. Burns
*Attorney, Agent, or Firm*—Lackenbach, Lilling & Siegel

[57] ABSTRACT

The emission of toxic pollutants by an internal combustion engine is reduced by the admixture of exhaust gas to the intake charge, especially during engine speeds intermediate between idle and full power.

3 Claims, 3 Drawing Figures

AUXILIARY POLLUTION CONTROL DEVICE FOR SPARK-IGNITION ENGINES

BACKGROUND OF THE INVENTION

The invention relates to auxiliary devices for the reduction of the emission of pollutants by spark ignition engines.

More particularly, the invention relates to such devices applied to automotive engines operating in the intermittent mode characteristic of traffic conditions in and near large urban areas.

Devices of the prior art, including those disclosed by the Inventor, have had some success in reducing the emission of noxious components in the exhaust of automobile engines and have enabled the manufacturers of such engines to meet the current standards imposed by the United States on such emissions.

If the specifications to be imposed in the period beginning after 1974 are to be met, the emission of pollutants in certain operating regimes of the automobile engine will have to be reduced. More particularly, the concentration of unburned hydrocarbons and of nitrogen oxides at speeds and operating cycles corresponding to heavy traffic conditions will have to be improved.

It is, therefore, a primary purpose of the invention to reduce the proportion of unburned hydrocarbon fuel in the exhaust of automobile engines when the vehicle is coasting with the throttle-valve closed.

It is another purpose of the invention to reduce the emission of nitrogen oxides generally in the exhaust of automobile engines in the speed ranges encountered in urban and suburban traffic.

It is a further purpose of the invention to teach the construction of devices to achieve the above purposes and compatible with the fuel systems of internal combustion engines with spark ignition; such devices being equally applicable to carburetor and direct injection systems.

SUMMARY

The invention reduces the emission of unburned hydrocarbons by an internal combustion engine and reduces the emission of nitrogen oxides in the exhaust of the engine by the admixture of some exhaust gas, approximately 10 to 15 percent of the total, into the intake stream. Such admixture also reduces the power output available from the engine, and it is therefore arranged that the admission of exhaust gas to the intake manifold be reduced at very low and very high engine speeds.

These auxiliary devices, applied to an engine whose fuel system is designed to reduce noxious emissions under normal driving conditions, reduce such emissions further so effectively that the very rigorous standards set by the proposed standards for the period 1975–1979 are readily met.

BRIEF DESCRIPTION OF THE ACCOMPANYING DRAWINGS:

DESCRIPTION OF THE PREFERRED EMBODIMENT

Figure 1:
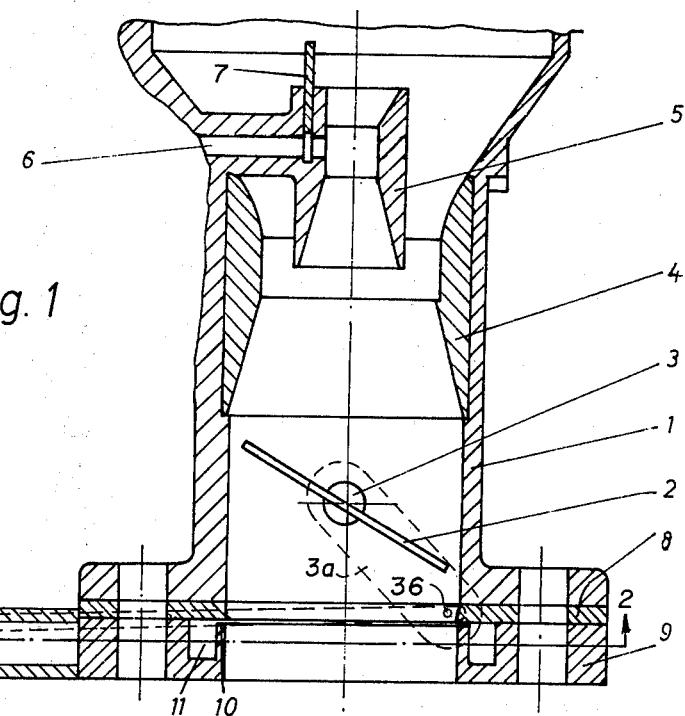
FIG. 1 is a transverse section through a carburetor fitted with the pollution control devices of the invention and includes an electrical circuit diagram for the operation of the servo valves.
Figure 2:
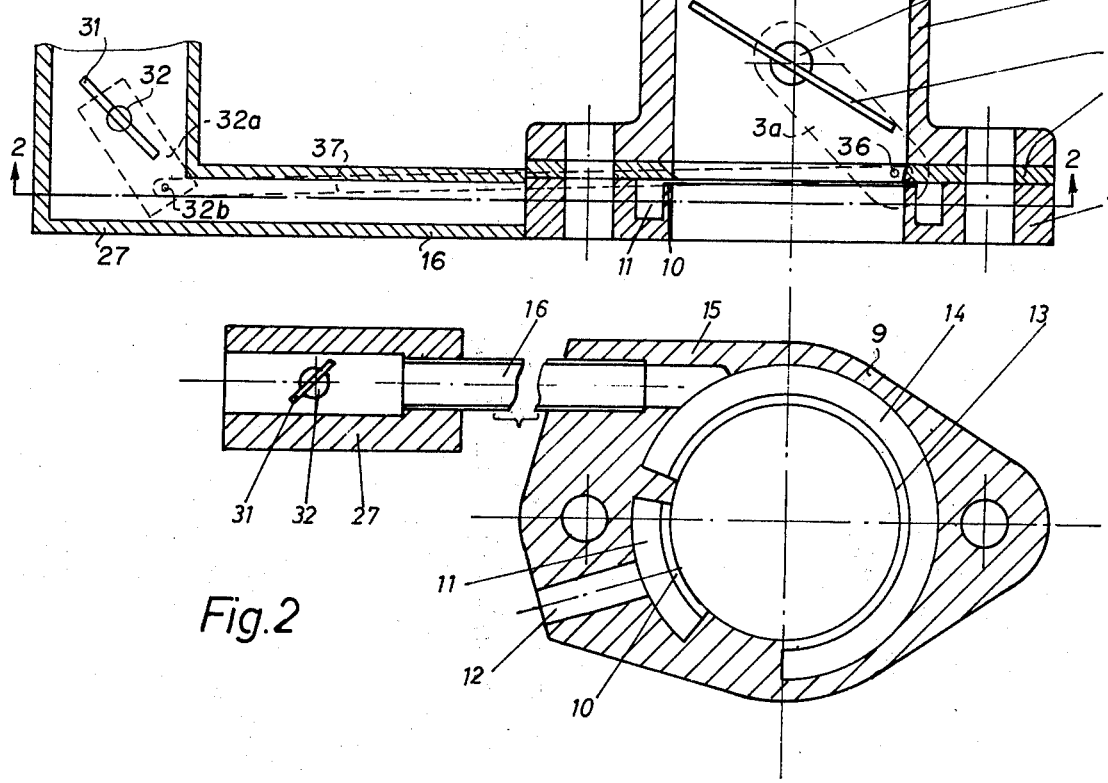
FIG. 2 is a horizontal section through the embodiment of FIG. 1 along lines 2–2.

The same carburetor, equipped with the auxiliary pollution control devices of the invention, is shown in the sectioned illustrations of FIGS. 1 and 2, in side and plan views respectively.

The main air passage of the carburetor 1 may be closed off by a tightly-fitting throttle-valve 2, pivoting on a shaft 3. A venturi 4 restricts the air passage above the throttle 2 and is, in turn, preceded by a primary atomizing nozzle 5, in the form of another venturi. A conduit 6 leads to the throat of the nozzle 5 and is supplied, by means of a main jet and associated secondary air passage, which are not illustrated for the sake of clarity and conform to the designs of the prior art, with a foaming emulsion of fuel and air. A slider 7 may be advanced, by mechanisms not shown, to cut off flow in the conduit 6.

When the engine is idling, the slider 7 is in the closed position and the throttle 2 prevents air flow in the main passage of the carburetor; the rich mixture for idling being supplied, along with the necessary combustion air through a channel 12. The requisite fuel and air for the idling mixture is admitted to the channel 12 via by-pass holes not shown in the illustration of FIG. 2. From channel 12 the idling mixture enters the plenum chamber 11 and flows thence to the main air passage of the carburetor 1 only by means of a continuous slit orifice 10 in a major portion of the peripheral wall separating the plenum chamber from the air passage. The slit orifice 10 has a uniform width as shown in FIG. 1 and is so sized that the idling mixture, at its proper setting, attains the speed of sound in flowing through it; a very high velocity at this point being desirable to prevent the carryover of fuel in the form of discrete droplets into the intake manifold with the attendant problems of condensation and non-uniform distribution to the several cylinders of the engine. Additionally, such a mixture, with the fuel fully vaporized, contributes substantially to the completeness of combustion and reduces the formation of noxious products in the combustion chamber, an effect readily supported by the available test results.

Figure 3:
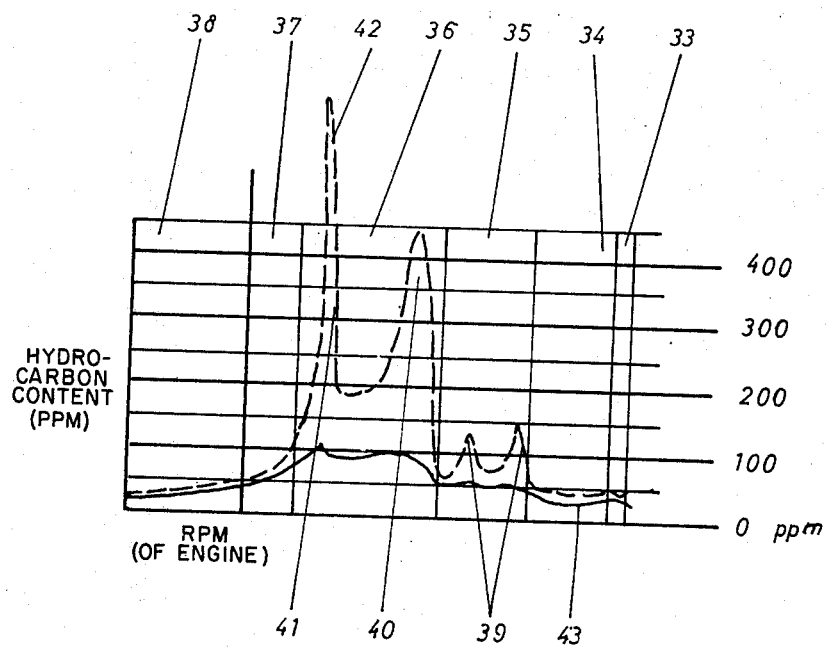
FIG. 3 is a graphical representation of the performance of a test engine, in terms of the emission of unburnt hydrocarbon compounds, both with and without the auxiliary pollution control devices of the instant invention.

FIG. 3 is a graphical illustration of the relative concentration of unburned hydrocarbons in the exhaust of a typical automobile under going a test generally know as the 'California cycle'. This concentration is expressed in parts per million (ppm) and is plotted on the vertical axis of FIG. 3. The horizontal axis is a time-dependant scale sub-divided into the several operating ranges of the California cycle;

range 33 is taken at a constant velocity of 24 kilometers per hour,
range 34 is an accelerating period from 24 to 48 kph,
range 35 is a further acceleration to 80 kph,
range 36 is a coasting deceleration from 80 to 32 kph,
range 37 is a further deceleration to standstill, and
range 38 is a period of engine idle, with the vehicle stationary.

The hydrocarbon concentrations in the exhaust of a test engine rovided with a carburetor of the prior art, not incorporating the auxiliary devices of the instant invention, is shown in a broken line 42; these concentrations are very low and show the results of certain prior inventions of the Inventor in reducing the polluting behaviour of the test engine.

It is readily seen that in the coasting range 36 two spikes of high hydrocarbon concentration appear in the line 42. The first of these is caused by the inertial effects experienced by the fuel in the several passages and jets of the carburetor upon the sudden closure of the throttle-valve 2; the fuel already in motion in these places continues to flow and creates a very rich mixture in view of the rapidly dropping air flow through the throttle-valve. A second spike is caused by the relatively high flow through the idling jet, induced by the very high vacuum of the engine rotating at high speed with closed throttle-valve, combining with the fuel retained on the walls of the intake manifold and accumulated in the nooks and crannies of the intake system. Such accumulation tends to reach a stable equilibrium at normal engine operation, is reduced when the engine decelerates and is reformed upon subsequent acceleration.

The channel 16 serves for the admission of exhaust gas into the intake manifold of the engine. This is of advantage in reducing the emission of noxious Nitrogen Oxides at times when the engine is not fully loaded.

Exhaust gas is admitted into the channel 16 from a passage 27 which may be obstructed by a rotary valve 31 pivoting on a shaft 32. The shaft 32 is interconnected with the shaft 3 of the throttle-valve 2 by a linkage described below. This linkage is so arranged that at idle the valve 31 is substantially closed and prevents the entry of exhaust gas into the carburetor; as the throttle-valve 2 is opened, the valve 31 is also opening to admit ever greater quantities of exhaust gas. With the thottle-valve 2 approaching the wide-open, full power position, the valve 31 begins to close, and blocks the admission of exhaust gas, when the accelerator is fully depressed, signalling for maximum power from the engine.

For example, the throttle 2 may have a travel of 80° between the fully open and fully closed positions and may have a lever 3a pivoting on the shaft 3 provided with a second pivot point 3b 23 millimeters from the shaft center; providing for a total travel of that second pivot of 30 millimeters over the range of the throttle. If the valve 31 is fully closed in a position at 105° relative to the wall of the passage 27, and approaches another fully closed position after an angular travel of 145°, a lever 32a attached to the shaft 32 would have to have an outboard pivot 32b 16 millimeters from the shaft center interconnected by rigid linking arm 37 with the similar outboard pivot on the lever attached to the shaft 3, to provide for the described effects.

Such a mechanism, combined with the flow characteristics of the valve 31, makes possible the admission of exhaust gas to the carburetor in the region roughly corresponding to engine power outputs ranging between one-third and three-quarters of the maximum.

The channel 16 connects with a passage 15 in the base 9 of the carburetor, and then with the plenum chamber 14, which communicates with the main air passage by means of throttling slit 13 in the wall of the latter. The velocity across the slit 13 is maintained at a high value approaching or reaching the local velocity of sound, to aid in preventing the formation of fuel condensate in the intake of the engine. The prevention of such condensate is further aided by the provision of a separating plate 8 between the lower element 9 of the carburetor and the main body. The plate 8 is provided with a conically converging orifice whose larger diameter corresponds to the diameter of the main carburetor passage, the sudden expansion below the lower edge providing a stripping surface for condensate flowing along the walls of the carburetor air passage.

In FIG. 3, the peaks 39 in the hydrocarbon concentration curves correspond to the shift points of the gear box utilized in the experimental vehicle.

What is claimed is:

1. In an internal combustion engine system having means to reduce the emission of toxic pollutants, the system comprising: a carburetor for feeding an intimate mixture of liquid fuel and air to the engine and having a principal throttle valve therein; an intake manifold in fluid flow connection with the carburetor, downstream of the principal throttle valve, and with the engine; an exhaust manifold in fluid flow connection with the engine; an exhaust-recirculation conduit in fluid flow connection with the exhaust manifold and with the intake manifold; and a second throttle valve in the recirculation conduit mechanically interconnected to the principal throttle valve, whereby the degree of opening of the second valve is governed by the degree of opening of the principal valve; the improvement comprising a distributor in fluid flow connection between the recirculation conduit and the intake manifold, the distributor being disposed about at least a major portion of the periphery of the intake manifold along at least a portion of the length thereof; and a continuous slit orifice of uniform width defined through the peripheral wall of the intake manifold and providing the only fluid flow connection between the distributor and the intake manifold, the slit extending around at least a major portion of the periphery of the intake manifold, whereby exhaust gases directed into said distributor flow through said continuous slit orifice of uniform width and are accelerated close to sonic speeds and injected into said intake manifold substantially uniformly about said least a portion of the periphery of said intake manifold to thereby substantially improve mixing of fuel and air within said intake manifold and reduce the amount of pollutants released by the internal combustion engine.

2. The system in accordance with claim 1, wherein the second throttle valve and the principal throttle valve are mechanically interconnected by at least one rigid linkage, and wherein the linkage is so disposed relative to the two valves that the second throttle valve is substantially closed when the principal throttle valve is at idle, the second throttle valve is fully open at the intermediate opening of the principal throttle valve and is gradually closed as the opening of the principal valve increases above the intermediate range.

3. The system in accordance with claim 1, comprising in addition, a converging orifice disposed in the intake manifold, immediately above the slit orifice.

* * * * *